United States Patent
Hodges et al.

[11] Patent Number: 5,845,882
[45] Date of Patent: Dec. 8, 1998

[54] STAPLE HOOK PIPE HANGER

[76] Inventors: B. Eugene Hodges, 761 Palmer Dr., Greenville, Mich. 48838; James Bruno, 650 Greentree, Ada, Mich. 49301

[21] Appl. No.: 721,464

[22] Filed: Sep. 27, 1996

[51] Int. Cl.[6] .............................. E21F 17/02; F16L 3/00
[52] U.S. Cl. .............................. 248/59; 248/62; 411/457; 411/920; 33/483
[58] Field of Search .................. 248/59, 58, 62, 248/74.2, 289.11; 411/457, 451, 920, 921; 33/483, 759, 760, 920

[56] References Cited

U.S. PATENT DOCUMENTS

| | | | |
|---|---|---|---|
| 1,086,442 | 2/1914 | Cornelius | 248/59 |
| 1,669,446 | 5/1928 | Bowers | 248/59 |
| 1,804,472 | 5/1931 | Leslie | 248/59 |
| 2,111,357 | 3/1938 | Cornell, Jr. | 248/59 |
| 2,449,265 | 9/1948 | Williams | 33/483 X |
| 2,592,362 | 4/1952 | Weeks | 33/483 X |
| 3,273,837 | 9/1966 | Willert et al. | 248/62 X |
| 3,403,592 | 10/1968 | Larson | 411/920 X |
| 3,888,439 | 6/1975 | Tuttle | 248/62 |
| 3,969,975 | 7/1976 | Krol | 411/457 X |
| 4,407,478 | 10/1983 | Hodges | 248/62 X |
| 5,221,064 | 6/1993 | Hodges | 248/59 |
| 5,385,320 | 1/1995 | Ismert et al. | 248/62 |
| 5,542,631 | 8/1996 | Bruno | 248/59 X |

*Primary Examiner*—Jose V. Chen
*Assistant Examiner*—Rodney B. White

[57] ABSTRACT

A pipe hanger for suspending a pipe from a support structure at a variety of angles includes a stem and a flexible hook attached to the stem. The stem has at least one groove suitable for accepting a staple for hanging the pipe hanger from the support structure. The grooves may be polygonal, allowing the pipe hanger to be suspended at a variety of angles. The hook has a curved portion to accept a pipe in a snap-fit position. The stem may be shortened to a suitable length by severing the stem at any one of the grooves.

18 Claims, 3 Drawing Sheets

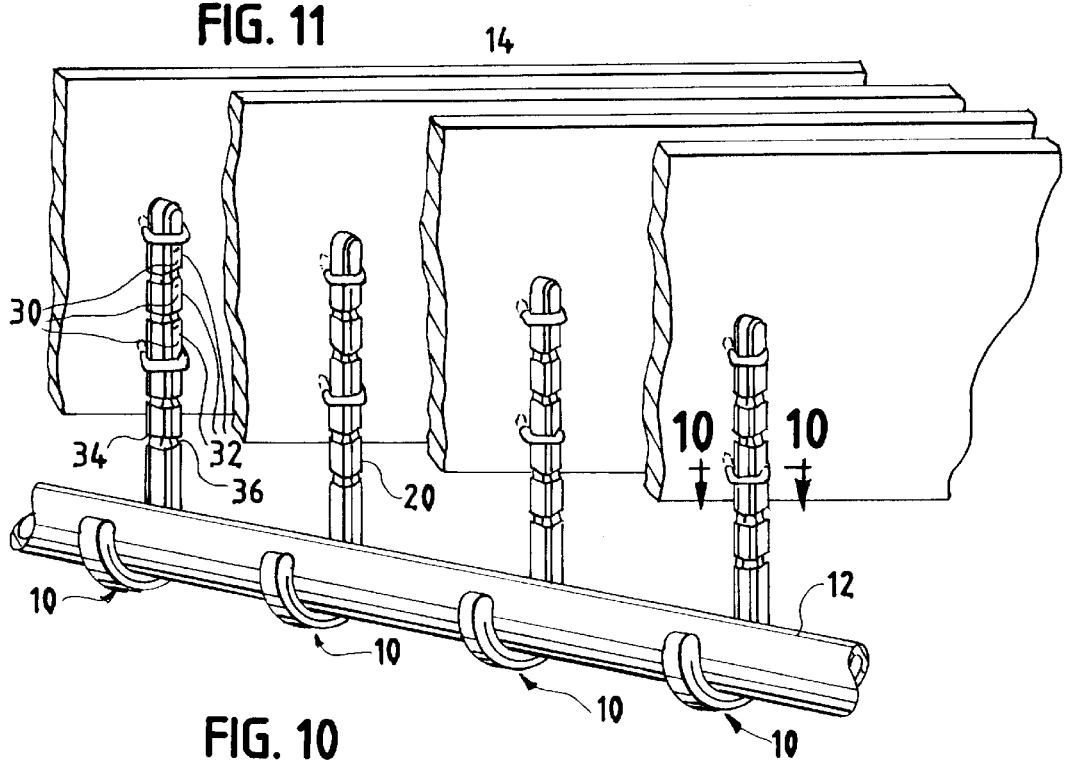
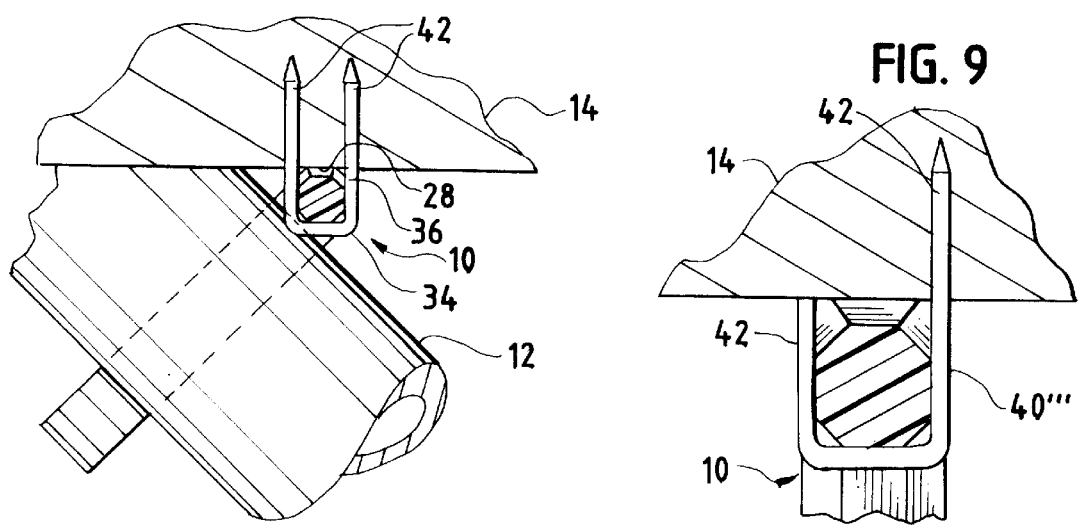
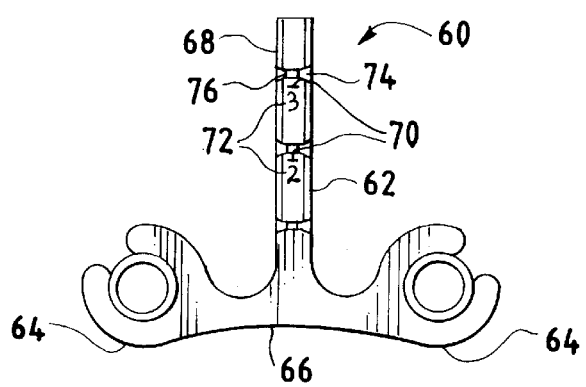

5,845,882

STAPLE HOOK PIPE HANGER

BACKGROUND

1. Field of the Invention

This patent relates to a pipe hanger for suspending pipes from a support structure. More particularly, this patent relates to a pipe hanger that greatly reduces the time and effort required for installation onto support structures and allows installation of the hanger at many different angles.

2. Description of the Related Art

Pipe hangers are used to hang pipes from support structures such as joists or rafters. Typically, a plurality of pipe hangers are used in parallel to suspend a pipe. The pipe hangers are first secured to the joists by nails or other means and the pipe is then snapped into the hook portion of the pipe hangers.

Conventional pipe hangers, such as that disclosed in U.S. Pat. No. 4,407,478, comprise a stem and a hook or clamp portion attached in fixed relationship to the stem for accommodating the pipe. The stem has a prismatic, though typically square, cross section. Holes in the stem accommodate nails or other means of attachment. Where the cross section of the stem is a square, two sets of holes may extend through the stem in a mutually perpendicular relationship to allow the hanger to be mounted on its front, rear, or lateral sides, thereby providing a limited amount of mounting flexibility. For example, pipe hangers constructed with stems that are square in cross section can be used to hang pipes either parallel or perpendicular to the joists from which they are suspended.

Other designs exist for pipe hangers that include a mounting portion that only allows mounting in a single direction, and most designs allow only for the mounting of a single pipe. More recent designs, such as that taught in my U.S. Pat. No. 5,542,631, allow for a rotating, sliding clamp to allow for various angles of installation and ease of positioning the hanger. That design also allows the pipe to be hung close to a ceiling or floor. However, that design can be more difficult and expensive to manufacture than simple pipe hangers.

Thus, a need exists for a simply manufactured pipe hanger that can be mounted at various angles to the support structure and placed closely to floors or ceilings with minimal modification.

SUMMARY OF THE INVENTION

The present invention is a pipe hanger for suspending at least one pipe from a support structure comprising an elongate stem for mounting to the support structure, at least one flexible curved portion extending from the elongate stem, and at least one, but preferably a plurality of grooves spaced evenly along the stem's length for receiving staples.

The grooves are designed to accept the legs of a staple so that the staple is inserted through the groove and into the support structure, thereby supporting the pipe hanger. In one embodiment the stem is square in cross section and the grooves form squares of smaller dimensions than the elongate stem. In other embodiments, the stem and grooves form a variety of shapes, including polygons. The sides of the grooves may be parallel to the sides of the elongate stem or they may be offset. When the grooves form a shape other than a square, or the square is offset, the elongate stem includes beveled edges so that the beveled edges are parallel to all sides of the shape of the grooves. This beveled edge serves as a flat surface to mate with the support structure when the pipe hanger is mounted.

It is an object of the present invention to provide an improved pipe hanger of the type described above providing increased flexibility in mounting pipes to support structures.

It is a another object to proved an improved pipe hanger which may be installed at various desired angles with respect to the support structure.

It is yet another object to provide an improved pipe hanger to suspend pipe in close proximity to a ceiling, sub-flooring, or other obstruction.

An additional object of the present invention is to provide a pipe hanger that may be set flush against a support structure for easy fastening of the pipe hanger to the support structure, yet provide a variety of angles at which the pipe hanger is mounted to the support structure.

A further object of the invention is to provide a pipe hanger that substantially reduces installation time and setup time, and avoids excessive design and adjustment time.

Further and additional objects will appear from the description, accompanying drawings, and appended claims.

THE DRAWINGS

FIG. 9 is a top view of a fourth type of staple fastening the pipe hanger of FIG. 1 to a support structure.

FIG. 10 is a perspective view of the pipe hanger of FIG. 1 fastened to a support structure 45 degree angle to FIG. 1.

FIG. 11 is a perspective view of a series of pipe hangers as shown in FIG. 1, attached to multiple, successive support structures at a 45 degree angle to FIG. 1.

FIG. 12 is a perspective view of one alternative embodiment of the present invention capable of hanging two pipes side by side.

DETAILED DESCRIPTION OF THE INVENTION

Figure 1:
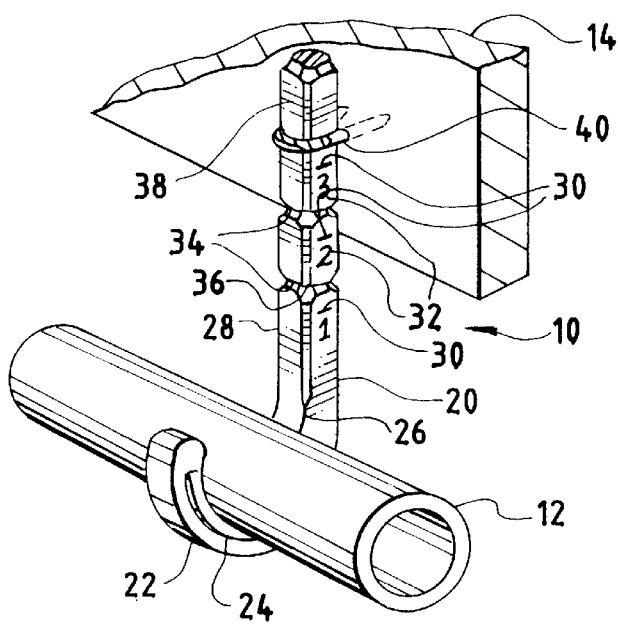
FIG. 1 is a perspective view of the invention supporting a pipe and attached to a support structure along its rear surface.

Turning to the drawings, FIG. 1 shows one embodiment of a pipe hanger 10 according to the present invention. The pipe hanger 10 comprises an elongate stem 20, a curved portion 22 with outwardly extending ribs 24, and a locking lobe 26. The elongate stem 20 may have at least one, but preferably a plurality of beveled edges 28, at least one but preferably a plurality of graduated markings 30, at least one but preferably a plurality of graduated numerals 32, at least one but preferably a plurality of grooves or channels 34 adapted to receive staples or other fastening means 40, and sides 38. Preferably, the grooves 34 have a cross section that is substantially polygonal with sides 36. Each staple 40 has legs 42. The invention is shown suspending a pipe 12 from a support structure 14.

The elongate stem 20 is mounted to the support structure 14 with the staple 40. The staple 40 is designed to fit in the grooves 34 so that some portion of the staple legs 42 fills the groove 34, supporting the elongate stem 20. The distance between the inner sides of the staple legs 42 is therefore less than the outer dimension of the elongate stem 20.

The use of a staple 40 to mount the pipe hanger 10 provides several benefits. It is quicker than nails and provides a more secure mounting. It is possible to use a staple gun to install the pipe hanger, further reducing installation time. It is also possible to pre-load staples 40 onto the pipe hanger 10 as the staples 40 will have a friction fit to the pipe hanger 10, allowing quicker and easier installation.

The grooves 34 may be formed along just two sides of the stem 20. Preferably, however, the grooves 34 are recessed along all sides of the stem 20, as shown in FIGS. 1–12. In other words, the grooves may only appear as two distinct indentations, one each on two opposite sides of the elongate stem 20, providing for a pipe hanger that has only two mounting orientations, or there may be many sides to grooves 36 allowing for a variety of mounting orientations.

The distance between parallel sides of the grooves 34 is substantially the same as the distance between the insides of the staple legs 42, allowing the staple 40 to fit snugly around opposite sides of grooves 34, forming a friction fit. This friction fit allows the staple 40 to be held in place for attaching the pipe hanger 10 to the support 14. Preferably, the elongate stem 20 has beveled edges 28 such that its cross section is substantially polygonal, where the cross section has the same number of sides as the grooves 36.

The grooves 34 also serve as convenient pilot cuts in the event the elongate stem needs to be shortened, such as for installation close to floors or ceilings. The graduated markings 30 and graduated numerals 32 also help determine the proper length to cut.

The curved portion 22 of the elongate stem 20 receives the pipe 12. The preferred embodiment includes outwardly extending ribs 24 along the curved portion 22 to increase its surface area and strength to support the pipe 12. A locking lobe 26 extends from the elongate stem 20 at the junction of the curved portion 22 and the elongate stem 20. The locking lobe 26 extends from the elongate stem 20 in the same direction as curvature of the curved portion 22. The curved portion 22 has a radius of curvature substantially the same as the radius of the pipe 12. The locking lobe 26 reduces the distance from the end of the curved portion 22 and the locking lobe 26 to less than the diameter of the pipe 12, thus extending the curvature of the inside diameter of curved portion 22 to less than the diameter of the pipe 12 and requiring a snap fit to insert the pipe 12 into the pipe hanger 10. The curved portion may flex outwardly in order to accept the pipe 12. The resiliency of the curved portion 22 will hold the pipe in place at the bottom of the curvature, allowing the pipe 12 to be inserted either before or after fastening the pipe hanger 10 to the support structure 12. It is possible to build the invention without the locking lobe 26, but the locking lobe 26 provides for a more secure snap-fit between the pipe 12 and curved portion 22.

Figure 2:
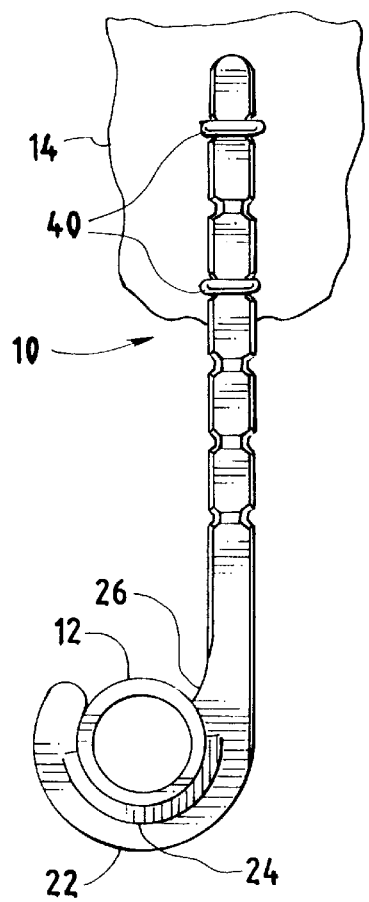
FIG. 2 is a side view of the pipe hanger of FIG. 1 shown fastened to the support structure at a 90 degree angle to FIG. 1.

FIG. 2 shows a side view of the pipe hanger 10 attached to a support structure 12 by a staple 40 rotated 90 degrees from the installation shown in FIG. 1. It can easily be seen from FIG. 2 that the pipe hanger 10 provides a method to support pipes from support structures 14 that are both parallel to the direction of the pipe 12 and perpendicular to the direction of the pipe 12.

FIG. 2 also shows more clearly the pipe 12 locked into the pipe hanger 10. Particularly, it shows the pipe 12 inserted into the curved portion 22. The radius of curvature of the curved portion 22 is extended by the locking lobe 26 to securely hold the pipe 12 in place.

Figure 3:
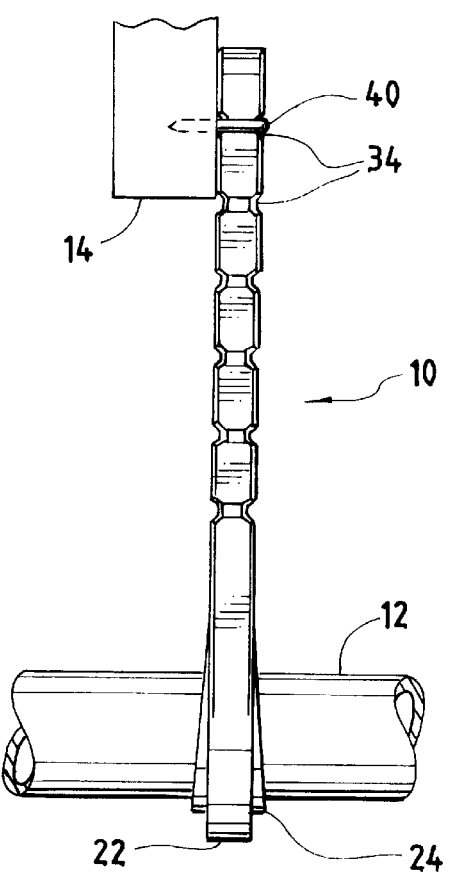
FIG. 3 is a rear view of the pipe hanger of FIG. 2.

FIG. 3 is a rear view of a pipe hanger 10 mounted as in FIG. 2. FIG. 3 shows a staple 40 inserted into the grooves 34 and into the support structure 14. The outwardly extending ribs 24 are shown supporting the pipe 12.

Figure 4:
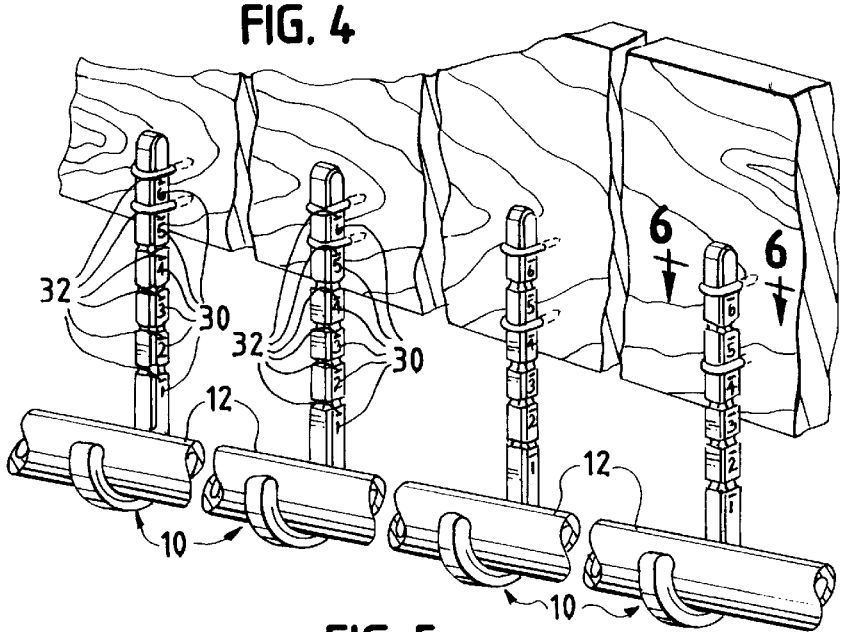
FIG. 4 is a perspective view of a series of pipe hangers as shown in FIG. 1, attached along their back surfaces to a support structure.

FIG. 4 shows a series of pipe hangers 10 suspending a pipe 12 parallel to a support structure 14. The pipe 12 travels at an angle relative to a horizontal plane to provide gravity flow to the liquid traveling through the pipe 12. The graduated markings 30 and graduated numerals 32 aid in determining where to fasten the pipe hanger 10 to the support structure 14.

Figure 5:
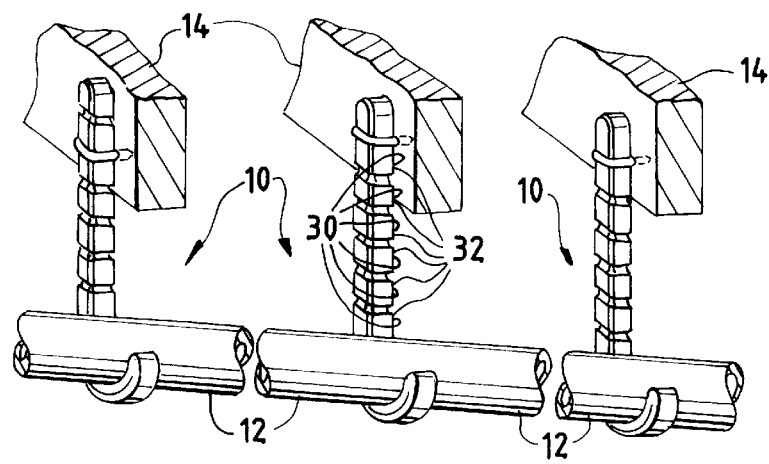
FIG. 5 is a perspective view of a series of pipe hangers as shown in FIG. 2, attached to multiple, successive support structures.
Figure 6:
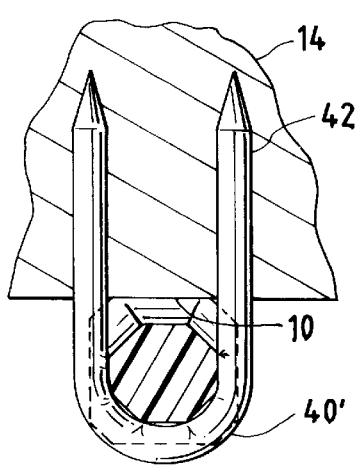
FIG. 6 is a top view of one type of staple fastening the pipe hanger of FIG. 1 to a support structure.
Figure 7:
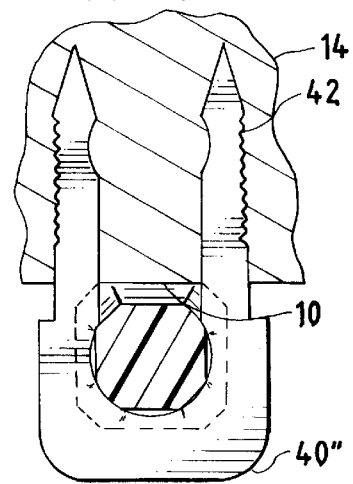
FIG. 7 is a top view of another type of staple fastening the pipe hanger of FIG. 1 to a support structure.
Figure 8:
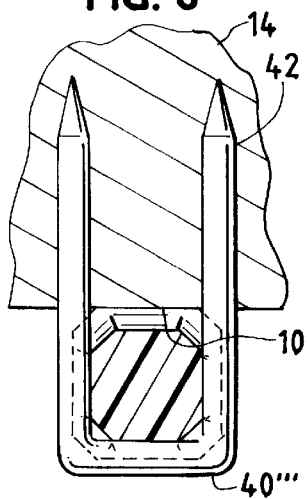
FIG. 8 is a top view of third type of staple fastening the pipe hanger of FIG. 1 to a support structure.

FIG. 5 shows a series of pipe hangers 10 suspending a pipe 12 perpendicular to a plurality of support structures 14. The graduated markings 30 and graduated numerals 32 aid in determining where to locate each pipe hanger 10 vertically. When the pipe hanger 10 is mounted near such obstructions as floors, ceilings, or sub-flooring, the grooves are convenient pilot lines for removing portions of the elongate stem 20.

FIGS. 6–9 show various styles of fasteners 40', 40'', 40''', and 40''''. These fastener styles are shown by way of example only and are not intended to limit the invention. Each fastener 40 mates closely with the interior walls of the groove 34, and each groove 34 cross section in these examples is an eight-sided polygon, or octagon. The fastener 40 will form a friction fit with the elongate stem 20 of the pipe hanger.

FIG. 9 shows an embodiment of a staple 40 where one staple leg 42 is only as long as one outer wall of the elongate stem 20 and one staple leg 42 is of standard length. This embodiment of the invention is useful for mounting the pipe hanger 10 to a support structure that has some areas not suitable for staples and some areas that are. It also reduces the effort and time necessary to install the pipe hanger.

FIG. 10 shows how the pipe hanger 10 may be mounted at an angle to the support structure 14 through use of the sides 36 of the grooves 34. The staple legs 42 of the staple 40 are parallel to the sides 36 of the grooves 34, but at an angle to the outside walls of the elongate stem 20. The beveled edge 28 is parallel to the support structure 14. In this embodiment, the pipe 12 is suspended at an angle of 45 degrees to the support structure, but that angle can change depending on the cross-sectional shape of the grooves 34.

FIG. 11 shows a series of pipe hangers 10 suspending a pipe 12 at an angle to a plurality of support structures 14, similar to the single pipe hanger 10 shown in FIG. 10. The sides of the grooves 36 determine the angle based on the cross-sectional shape of the grooves 34. The graduated markings 30 and graduated numerals 32 aid in determining where to locate each pipe hanger 10 vertically. When the pipe hanger 10 is mounted near such obstructions as floors, ceilings, or sub-flooring, the grooves are convenient pilot lines for removing portions of the elongate stem 20.

FIG. 12 depicts a pipe hanger 60 capable of hanging two pipes at once. The elongate stem 62 joins with a cross piece 66 perpendicular to the elongate stem 62. The stem connects two curved portions 64. The curved portions 64 extend more than 180 degrees, preferably at least 270 degrees. The ends of the curved portions 64 must be closer together than the radius of the pipe to be suspended so that the pipe can be forced into the curved portions 64, insuring a snap-fit connection. The radius of curvature for each of the curved portions 64 is approximately equal to the radius of the pipe to be suspended. The elongate stem 62 may have all the features of the previous embodiments such as beveled edges 68, graduated markings 70, graduated numerals 72, grooves 74, and sides of grooves 76. The pipe hanger 60 can be mounted in a variety of angles to the support structure, and can suspend the pipes parallel to the support structure or at a variety of angles to the support structure 14.

In the embodiment of the invention shown in FIGS. 1–12, the grooves 34 are in the shape of an octagon, allowing the pipe hanger to be mounted in at least eight different positions relative to the support structure 14. The staple 40 in every embodiment, as shown in FIGS. 6–9, has two legs at least as long as the elongate stem is wide and at least one leg long enough to be suitable for securing the pipe hanger 10 to a support structure 14. The pipe hanger 10 may be mounted perpendicular, parallel, or at an incline relative to the support structure.

It is possible to mount two pipe hangers back to back, allowing multiple hanging from the same point of support. It is also possible to mount multiple pipe hangers next to each other at different heights, mounting pipes over one another.

Other embodiments of the invention are contemplated which do not depart from the scope of the inventions claimed. While the preferred form of the invention has been shown and described, it is to be understood that the invention is not to be taken as limited to the specific form described, and that changes and modifications may be made without departing from true concept of the invention. It is therefore contemplated that the foregoing teachings and the appended claims define the present invention and any and all changes and modifications.

I claim:

1. A pipe hanger for suspending a pipe from a support structure, the pipe hanger comprising:

a rigid, elongate stem suitable for mounting to a support structure, the rigid, elongate stem defining an axis and comprising a mounting means defined by at least one channel circumferentially disposed about the rigid, elongate stem and suitable for accepting a fastening means; and at least one curved portion connected to the rigid, elongate stem for receiving the pipe wherein the curved portion comprises a free end, the free end and the rigid, elongate stem defining a distance between the rigid, elongate stem and the free end.

2. The pipe hanger of claim 1 wherein the channel has a cross section that is substantially polygonal.

3. The pipe hanger of claim 2 wherein the cross-section of the channel is an even number sided polygon.

4. The pipe hanger of claim 3 wherein the rigid elongate stem has a cross section that is substantially polygonal.

5. The pipe hanger of claim 4 wherein the cross-section of the stem is an even number sided polygon.

6. A pipe hanger arrangement for mounting at least one pipe on an incline relative to a support structure the pipe hanger arrangement and at an angle to a support structure comprising a plurality of pipe hangers according to claim 2, wherein;

the curved portion of each pipe hanger receives and secures a pipe in a snap fit connection;

the hangers are mounted to a plurality of supports at different heights on the support relative to the adjacent pipe hangers and at an angle to the plane of the support structure; and an axis defined by the curved portions of each pipe hanger is at an angle relative to the support structure so as to mount the pipe at an incline and at an angle to the support structure.

7. The pipe hanger according to claim 2 wherein the curved portion forms an arc of about 270 degrees.

8. The pipe hanger according to claim 2 wherein the pipe hanger is integrally molded in one piece from a resilient plastic material.

9. The pipe hanger of claim 1 further comprising fastening means wherein the fastening means is frictionally retained in the channel.

10. The pipe hanger of claim 9 wherein the fastening means is at least one staple.

11. The pipe hanger of claim 10 wherein the rigid elongate stem has graduated markings and graduated numerals affixed to it to assist in placing the curved portion of the pipe hanger at a desired distance from the support structure.

12. The pipe hanger of claim 10 wherein the curved portion has a radius of curvature where the radius of curvature defines an arc from a junction where the curved portion attaches to the rigid, elongate stem to the free end of the curved portion of at least 180 degrees, so that the distance between the rigid, elongate stem and the free end is slightly less than a diameter of a pipe such that the pipe can be securely seated and snap-fit into the curved portion by forcing the pipe downward toward the curved portion from a position between the end of the curved portion and the rigid, elongate stem.

13. The pipe hanger according to claim 1 further comprising at least one outwardly extending rib extending along side of the curved portion.

14. The pipe hanger according to claim 1 further comprising a junction where the curved portion attaches to the rigid, elongate stem, a locking lobe located at the junction such that the locking lobe extends the arc of the curved portion, wherein the locking lobe is shaped to force the free end of the curved portion to flex outwardly when a pipe is forced downward into the curved portion so that the pipe snaps below the locking lobe and is securely fastened in the curved portion in a snap-fit connection.

15. The pipe hanger according to claim 11 wherein the at least one curved portion forms an arc of about 270 degrees.

16. The pipe hanger according to claim 14 wherein the curved portion comprises two curved members, each having a radius of curvature extending beyond 180 degrees, and each connected to the elongate stem by a cross piece that is integrally mounted to the rigid, elongate stem.

17. The pipe hanger according to claim 1 wherein:

the channels include interior sides of channels so that a cross-section of the interior sides of channels, taken perpendicular to the axis of the rigid, elongate stem, forms a symmetrical shape such that, when a staple having staple legs is used as the fastening means, the staple legs will fit around parallel interior sides of channels snugly;

the rigid, elongate stem includes beveled edges that are parallel to the sides of any channels other than those parallel to the sides of the rigid, elongate stem so that a staple may snugly fit the elongate stem at a plurality of angles and the beveled edges provide for a flat mating surface to the support structure, allowing attachment of the pipe hanger to be mounted to a support structure at a variety of angles;

a junction is located where the rigid, elongate stem and the curved portion meet, a locking lobe is located at the junction reducing the distance between the rigid, elongate stem and the free end of the curved portion; and the curved portion has a diameter and a radius of curvature that defines an arc from the junction of the curved portion and the rigid, elongate stem to the free end of the curved portion, such that the distance between the rigid, elongate stem and the free end is reduced by the locking lobe, and is less than the diameter of the curved portion with the curved portion being designed so that a pipe having a diameter approximately the same as the diameter of the curved portion can be securely seated and snap-fit into the curved portion by forcing the pipe downward toward the curved portion from a position between the free end of the curved portion and the stem.

18. The pipe hanger according to claim 1 wherein the curved portion comprises two curved members, each having a radius of curvature extending beyond 180 degrees, and each connected to the elongate stem by a cross piece that is integrally mounted to the rigid, elongate stem.

* * * * *

UNITED STATES PATENT AND TRADEMARK OFFICE
CERTIFICATE OF CORRECTION

PATENT NO. : 5,845,882
DATED : December 8, 1998
INVENTOR(S) : B. Eugene Hodges and James Bruno It is certified that error appears in the above-identified patent and that said Letters Patent is hereby corrected as shown below:

Column 5, claim 4, line 1,  "rigid elongate" should read --rigid, elongate--

Column 5, claim 6, line 2,  "structure" should read --structure,--

Column 5, claim 6, line 5,  "wherein;" should read --wherein:--

Column 6, claim 11, line 1,  "rigid elongate" should read --rigid, elongate--

Column 6, claim 13, lines 2-3  "extending along side of the curved portion" should read --extending along at least one side of the curved portion--

Signed and Sealed this

Ninth Day of March, 1999

Attest:

Attesting Officer

Q. TODD DICKINSON

Acting Commissioner of Patents and Trademarks